Sept. 19, 1967     T. R. YOUNG     3,342,502
TOOL CHUCK
Filed April 15, 1965
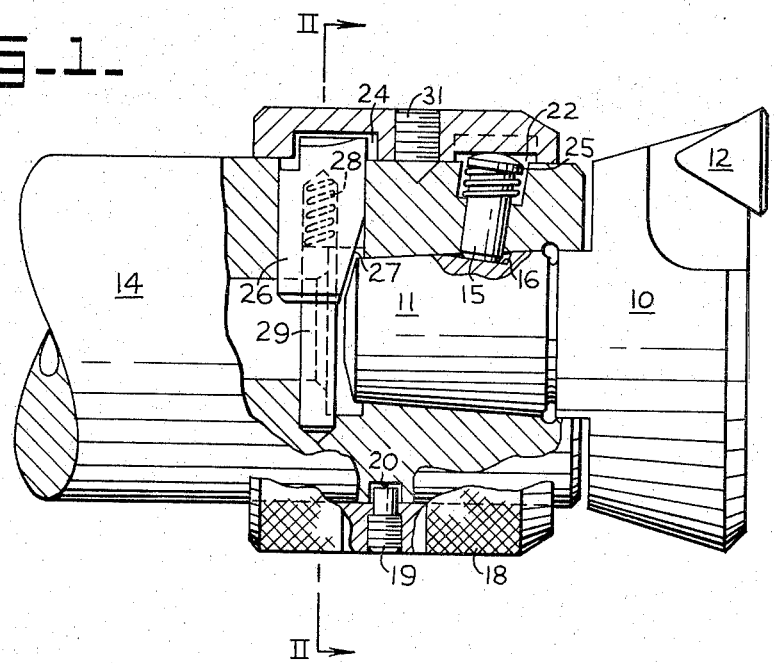
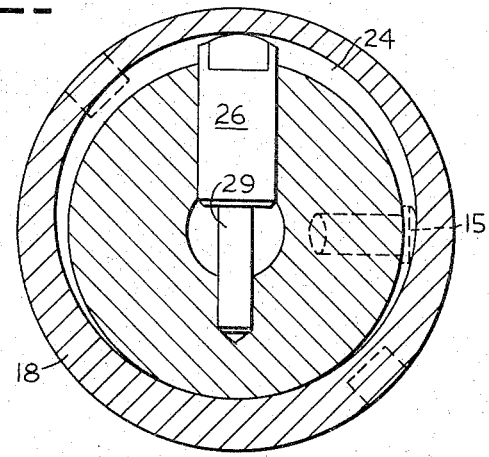
INVENTOR.
TEDDY R. YOUNG
BY
*Fryer, Tjensvold, Feix & Phillips*
ATTORNEYS

United States Patent Office 3,342,502
Patented Sept. 19, 1967

3,342,502
TOOL CHUCK
Teddy R. Young, East Peoria, Ill., assignor to Caterpillar Tractor Co., Peoria, Ill., a corporation of California
Filed Apr. 15, 1965, Ser. No. 448,509
1 Claim. (Cl. 279—81)

ABSTRACT OF THE DISCLOSURE

A chuck for holding a tool in a lathe or milling machine or the like having two radially movable pins, one being arranged to engage the shank of a tool to retain it in the chuck and the othed being arranged to engage the inner end of the shank to urge it out of the chuck and a collar having two eccentric grooves surrounding the chuck and each groove engaging the outer end of one of said pins and so arranged that upon rotation of the collar, one pin will be released and the other pin engaged to urge the tool out of the chuck.

---

Many tools are held in place by a tapered spindle on the tool fitting a tapered socket in a tool holder or chuck. Locking pins have also been used as positive securing means to prevent vibration or shock from separating the tapered parts. Such locking means have assumed the form of a pin slidable into engagement with the tool and engaged and released by cam means in a rotary collar surrounding the chuck so that insertion and securing of a tool can be accomplished very quickly. However, removing a tool from such a chuck is often difficult because the tapered parts stick or "freeze" together and can be separated only by a sharp blow or high pressure.

It is an object of the present invention to provide a tool holder which is operable by slight rotary movement to lock a tool in place and is also operable by similar movement to release the locking means and effect positive separation of the tapered tool spindle from the tapered socket in the chuck.

Further and more specific objects and advantages will become apparent from an understanding of the following description which refers to the accompanying drawing.

In the drawing:

FIG. 1 is a view partially in elevation and partially in central section of a tool and chuck embodying the present invention; and FIG. 2 is a sectional view taken on the line II—II of FIG. 1, but showing an alternate disposition of the pin members.

In FIG. 1 of the drawings, the tool is illustrated as having a head 10 and a shank 11. A hardened cutting insert 12 is held in the head by conventional means not shown. The chuck comprises a body 14 which is secured by means (not shown) to the power actuated driving mechanism of a machine which imparts rotary motion to the chuck. The chuck has a tapered socket, as shown which receives the tapered shank of the tool and a pin 15 is engageable with a flat 16 on the side of the shank 11 to prevent it from working out of the socket due to shock or vibration. A collar 18 is rotatable about the body of the chuck and is held against longitudinal displacement by a set screw 19 which has an end projecting into a groove 20 which extends part of the way around the circumference of the chuck. The inside of the collar is provided with a tapered or eccentric groove shown at 22 in FIG. 1 and similar to a groove shown at 24 in FIG. 2. The tapered groove 22 receives the head of the pin 15 so that upon rotation of the collar in the proper direction a camming action takes place and the shallow portion of the tapered groove will force the pin against the flat on the shank of the tool. A spring 25 surrounds the pin to urge it away from contact with the shank when the collar is rotated in the opposite direction to present a deep portion of the groove over the head of the pin.

Frequently, and particularly when heavy pressure has been exerted upon the cutting face of the tool, the tapered shank will have been driven so tightly into the tapered socket that it is difficult to remove. The present invention insures removal of the tapered shank and insures its removal by the same movement of the collar 18 which permitted retraction of the pin 15. To accomplish this, a large pin 26 having a taper 27 on its lower end is slidably fitted to project through the wall of the chuck just behind the shank of the tool and with its tapered surface in engagement with the inner end of the shank. A spring 28 normally urges this tapered pin outwardly, the spring being received in a bore in the pin and seating at its inner end on a dowel pin 29 supported in a hole in the opposite side of the chuck. The outer end of the tapered pin 26 is received as also shown in FIG. 2 in the previously described tapered or eccentric groove 24 so that rotation of the collar in one direction permits the spring 26 to retract the tapered pin while upon rotation in the other direction the narrow portion of the groove in the collar forces the tapered pin inwardly so that its surface 27 bears forceably against the inner end of the shank and causes ejection of the tool. When the tool is assembled in the chuck and locked in place, it may be desirable to secure the chuck against rotation and this can be done by a set screw as illustrated at 31 in FIG. 1 but in most cases this type of securing has been found unnecessary.

In FIG. 1, the tapered pin 26 and the locking pin 15 are shown as located in the same plane but FIG. 2 shows an alternate arrangement where they are disposed at 90° to each other. This is a preferred arrangement because the two grooves 22 and 24 can then be machined from the same center so that the collar holds the pin 15 inwardly while in the same position releasing the pin 26 and as can be seen in FIG. 2, rotation of the collar 18 in a clockwise direction to approximately 90° would simultaneously release the pin 15 and cause inward movement of the pin 26 to effect ejection of the tool.

I claim:

A generally cylindrical chuck with a tapered socket to receive a tapered tool shank, a radial opening in the chuck intersecting the inner end of the shank, a pin slidable in the radial opening and having an inclined end engageable with the end of a tool shank in the socket, a collar rotatable on the chuck and having an eccentric groove receiving the outer end of said pin whereby the collar can be rotated to move the pin inwardly and disengage the shank from the socket, said shank having a flat on one side, said chuck having a second radial opening, a second pin slidable in the second opening to engage the flat for retaining the shank in the chuck, said collar having a second eccentric groove receiving the outer end of the second pin, said eccentric grooves being arranged to release the second pin and engage the first upon rotation of the collar in one direction.

References Cited

UNITED STATES PATENTS

| 1,050,385 | 1/1913 | Palmgren | 279—103 |
| 1,278,427 | 9/1918 | Bocorselski | 279—1 |
| 1,405,921 | 2/1922 | Kipniss | 279—1 |
| 1,433,527 | 10/1922 | Browand | 279—81 |
| 2,407,471 | 9/1946 | Burk | 279—103 |
| 2,731,273 | 1/1956 | Edens | 279—81 |

ROBERT C. RIORDON, *Primary Examiner.*

E. A. CARPENTER, *Assistant Examiner.*